United States Patent
Gold et al.

[19]

[11] Patent Number: 6,006,296
[45] Date of Patent: Dec. 21, 1999

[54] SCALABLE MEMORY CONTROLLER

[75] Inventors: Anthony P. Gold, Wayne; Michael K. Benton, Malvern; Philip C. Bolyn, Norristown; Eric D. Aho, Phoenixville; Mark D. Luba, Plymouth Meeting, all of Pa.

[73] Assignee: Unisys Corporation, Blue Bell, Pa.

[21] Appl. No.: 08/857,494

[22] Filed: May 16, 1997

[51] Int. Cl.⁶ .................................................. G06F 13/00
[52] U.S. Cl. .......................... 710/100; 711/170; 710/131
[58] Field of Search .................................. 711/149, 170; 710/100, 101, 102, 103, 104, 131

[56] References Cited

U.S. PATENT DOCUMENTS

| | | |
|---|---|---|
| 5,255,239 | 10/1993 | Taborn et al. . |
| 5,522,059 | 5/1996 | Marushima et al. ..................... 711/149 |
| 5,613,152 | 3/1997 | Van Meerberger et al. ........... 711/149 |
| 5,802,580 | 9/1998 | McAlpine ............................... 711/149 |
| 5,841,775 | 11/1998 | Huang ..................................... 370/422 |

FOREIGN PATENT DOCUMENTS

| | | |
|---|---|---|
| 0 327 203 A3 | 8/1989 | European Pat. Off. . |
| WO 86/03608 | 6/1986 | WIPO . |

*Primary Examiner*—Hiep T. Nguyen
*Attorney, Agent, or Firm*—John B. Sowell; Mark T. Starr; Sterne, Kessler, Goldstein & Fox P.L.L.C.

[57] ABSTRACT

A single ASIC memory controller has full interconnectivity between various modes on the ASIC: input controller, memory controller, and output controller. The single ASIC includes an input controller section, a memory controller section, and an output controller section. The ASIC architecture is designed to allow any of the sections to be bypassed. Using the bypass mechanism, the ASIC can be combined with other like ASICs to increase system performance and capabilities without the need for ASIC redesign. The ASIC design can be used in memory subsystems that are scalable depending on user requirements.

16 Claims, 7 Drawing Sheets

SCALABLE MEMORY CONTROLLER

BACKGROUND OF THE INVENTION

1. Field of the Invention

The present invention is directed to aggregating functionality on a single application specific integrated circuit (ASIC). More specifically, the present invention is directed to a system for providing a plurality of modes and interconnectability between ASICs to achieve scaling.

2. Related Art

Conventional memory controller boards comprise a number of application specific integrated circuits (ASICs). The ASICs can be functionally divided into three categories: memory input, memory output, and memory controller. Memory input ASICs accept inputs from requesters. A requester requests access to memory. The memory input ASIC provides the requester with the means to input the request to memory. The memory input ASIC routes a request to a memory controller ASIC. The memory controller ASIC processes the request and determines the appropriate memory accesses required to handle the request. For example, for a READ request, the memory controller ASIC determines the address of the request, performs a memory access, and obtains the data at the requested address. The memory output ASIC in conventional systems functions to return data to the requester. In the case of the READ request above, for example, data to be returned to the requester is sent to the memory output ASIC for subsequent return to the requester.

There are several problems with the conventional design. First, a separate ASIC must be designed for each function: memory input, memory output, and memory control. This increases system design and fabrication cost. Moreover, interconnectivity between functions is not flexible. That is, the ASIC's configuration cannot be changed as system requirements change. In addition, because of the inflexible interconnectivity, designs using conventional ASICs are not scalable. That is, it is difficult to expand the capability of the system without adding new boards. Addition of new boards, significantly increases system costs.

Thus, what is desired is an ASIC design that reduces or eliminates the need for separate ASIC designs for separate functionality. In addition, the design methodology should provide flexible interconnectivity between functionality, as well as provide scalability to grow as system requirements grow.

SUMMARY OF THE INVENTION

The present invention reduces the need to design separate ASICs, having particularly functionality, by combining the required functionality on a single ASIC. That is, for a memory subsystem, the present invention provides a single ASIC having memory input, memory output, and memory controller functionality. As a result, only one ASIC design is required. Moreover, the ASIC design of the present invention provides increased flexibility over conventional memory board designs by providing full interconnectivity between the various functions. That is, within any single ASIC, any memory input can be directed to any memory controller, or any memory output. Likewise, within any single ASIC, any memory controller output can be directed to any memory output. The ASIC design of the present invention achieves even greater flexibility by allowing any functional level: memory input, memory output, or memory controller, to be by-passed. In this manner, an ASIC designed according to the teaching of the present invention can function as only an input ASIC, an output ASIC, or a controller ASIC.

Scalability is provided by the present invention by interconnecting multiple ASICs, designed according to the preferred embodiment, on a single board. By combining levels of ASICs, a user can create a system having pluralities of inputs, outputs, and controller ASICs. The pluralities can grow as system requirements grow, often without having to add new memory controller boards.

BRIEF DESCRIPTION OF THE FIGURES

The present invention will be described with reference to the accompanying drawings, wherein.

DETAILED DESCRIPTION OF THE PREFERRED EMBODIMENTS

The present invention is directed to a flexible ASIC design for a memory controller, that significantly reduces design and fabrication costs. In addition, the ASIC design provides scalability to adapt to changing system requirements. Because of the modular design of the ASIC, the present invention can be practiced in any ASIC having multiple functionalities wherein it is desirable to provide interconnectivity between the functional modalities. The preferred embodiment, however, is described with respect to an ASIC designed for memory control including inputting a memory request (e.g., READ or WRITE) from a requester, processing the memory request, and outputting data back to the requester.

Figure 1:
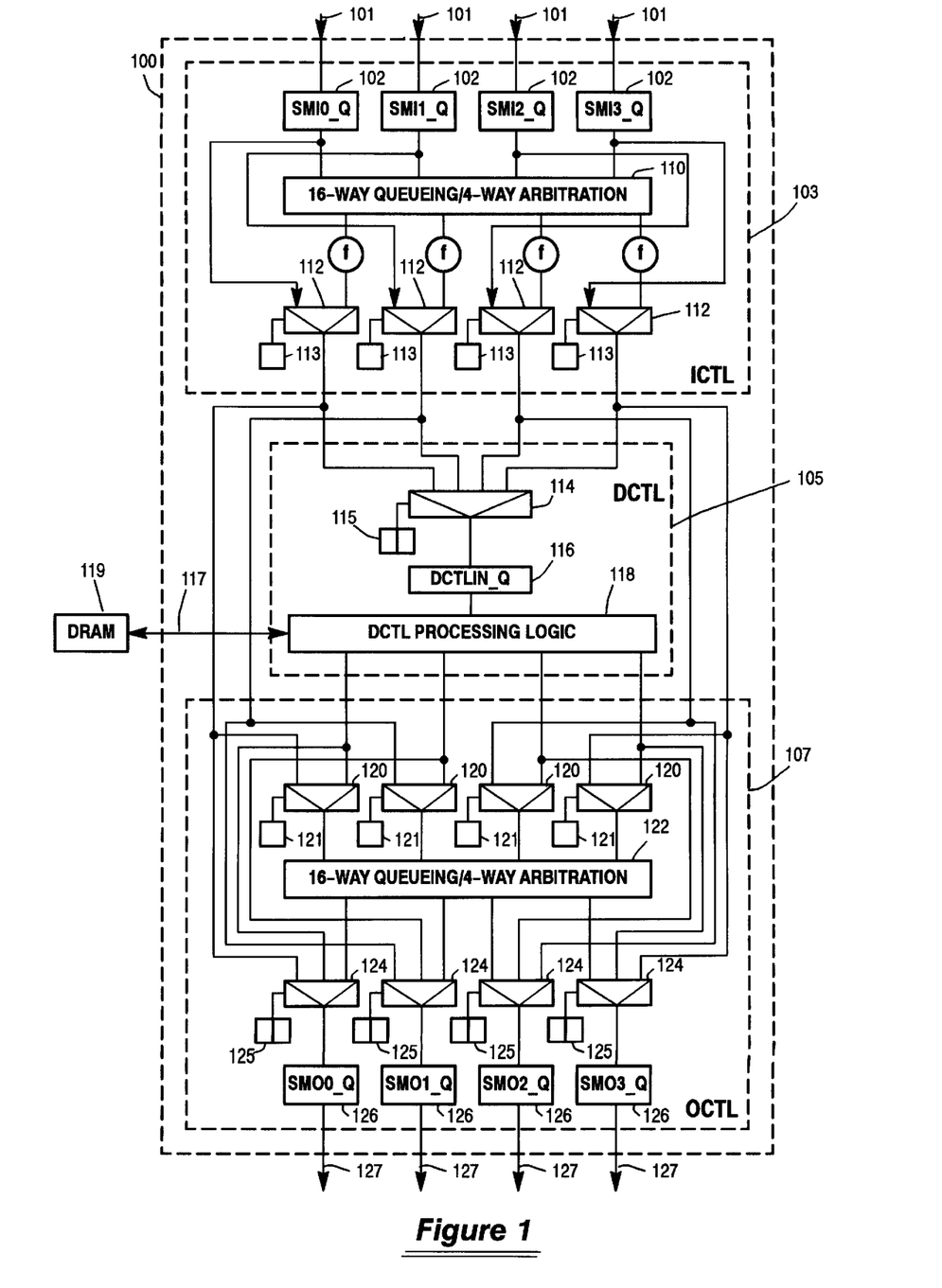
FIG. 1 is an ASIC 100 having an architecture designed according to the preferred embodiment of the present invention.

A memory controller ASIC 100 having an architecture designed according to the preferred embodiment is illustrated in FIG. 1. The ASIC 100 has three functional sections or components: an input controller section 103, a dynamic random access memory (DRAM) controller section 105, and an output controller section 107. The input controller section 103 has a set of input staging registers 102, and input queue 110, and a set of 2:1 output multiplexers 112. Each output multiplexer 112 is controlled by a unique controlling or selection flip-flop 113. The DRAM controller section 105 has a 4:1 input multiplexer 114, an input staging register 116, and processing logic 118. The 4:1 input multiplexer 114 is controlled by a register 115. The output controller section 107 has a set of 2:1 input multiplexers 120, a queue 122, a set of 3:1 output multiplexers 124, and a set of output staging registers 126. Each input multiplexer 120 is controlled by a unique flip-flop 121. Each output multiplexer 124 is controlled by a unique register 125.

As is described below, this basic architecture provides the interconnectivity and flexibility of the present invention. The ASIC 100 can be configured to operate in a number of modes, depending on the configuration of the multiplexers. Configuring the multiplexers to allow the ASIC 100 to operate in one of its modes is referred to as moding.

The input controller section 103 accepts a request from a requester on lines 101. The requester can be any process running on a processor, for example a central processing unit (CPU) (not shown), to which the present invention is attached by lines 101. Thus, e.g., the request, a memory READ or WRITE request is transmitted to the memory controller ASIC 100. Each line 101 can receive an individual request separate from the other input lines 101. In the preferred embodiment, there are four input lines 101. Thus, the ASIC 100 of the preferred embodiment can accept up to four independent input requests.

To provide assurance for data integrity, the preferred embodiment provides a set of input staging registers 102. Each input staging register 102 corresponds to a single one of the input lines 101. Thus, a request from a requester is staged in one of the input staging registers 102 prior to subsequent processing by the memory controller ASIC 100. The input registers 102 are coupled to the input queue 110 and a 2:1 multiplexer 112.

In the preferred embodiment, the input queue is a sixteen deep queue, having four-way arbitration. That is, the queue can store up to sixteen values for each input request line 101. It would be apparent to those skilled in the art that any queuing is acceptable. Thus, the queue might be deeper or not as deep. Moreover, independent queues can be used. Thus, four independent queues could be used in an alternate preferred embodiment. Outputs from the input queue 110 are coupled to a set of 2:1 output multiplexers 112.

The output multiplexers 112 have 2 inputs. One of the inputs, as just described, is an output from the input queue 110. The other input is from one of the input staging registers 102. Each input staging register 102 is coupled to a unique one of the set of output multiplexers 112. This ASIC architecture provides a means for bypassing the input queue 110. Bypassing the input queue 110 in enables the ASIC 100 to essentially bypass the input controller section 103. By bypassing the input controller section 103, the ASIC 100 can operate as either a DRAM controller (output functionality also bypassed as described below), or an output controller (DRAM controller functionality also bypassed as described below). This feature of the present invention provides increased flexibility and scalability over conventional systems.

The output of each multiplexer 112 is controlled by a selection signal. In the preferred embodiment, the selection signal is the state of a flip-flop 113. There is a unique flip-flop 113 for each multiplexer 112. As is well-known, a flip-flip is a bistable device that will store a state until instructed to change state. For example, a toggle flip-flop changes state in response to the assertion of its toggle input. Any device that can store a state can be used including flip-flops. Moreover, devices such a ROMs, PROMs, EPROMs, RAMs, and other devices that can store a plurality of states can be used to store the states of all of the flip flops 113, as well as other control flip-flops described below. As shown in FIG. 1, one state of the flip-flops 113 bypasses the input queue 110. The other state of the flip-flop 113 uses the output of the input queue 110. Because the flip-flops are independently controllable, the multiplexers are not constrained to act in unison. Thus, one output multiplexer 112 can bypass the input queue 110, while another output multiplexor 112 uses the output of the input queue 110.

The output of the input controller section 103 (the outputs of each of the output multiplexers 112) provides input to the DRAM controller section 105. In the preferred embodiment, only one DRAM array 119 is coupled (via bus 117) to the DRAM controller section 105 for each ASIC 100. One of the multiple inputs, from the multiple output multiplexers 113, is selected by input multiplexer 114. In the preferred embodiment, the input multiplexer 114 is a 4:1 multiplexer. The selection is performed according to a control signal generated by a control register 115 in a well known manner. Such a control register is well known in the art. The state of the control register 115 determines which of the four inputs is passed through to the DRAM controller section 105. The output of the input multiplexer 114 is staged in a staging register 116.

The processing logic 118 accepts the input from the staging register 116. The processing logic 118 in the preferred embodiment is a memory controller. The memory controller controls accesses to DRAM 119. The DRAM 119 is coupled to the ASIC 100 via bus 117. The bus 117 is used to pass data and control between the ASIC 100 and the DRAM 119. The processing logic performs the desired memory access, e.g., a READ or a WRITE. The processing logic 118 accepts any READ data and/or status data generated by the READ or WRITE request. The processing logic 118 can transfer the accepted data to the requester via the output controller section 107.

The output controller section 107 accepts data from either the processing logic 118 or input data that bypasses the DRAM controller section 105 altogether. Which data to use is determined by the set of input multiplexers 120. The input multiplexers are controlled by flip-flops 121. There is an individually configurable flip-flop 121 for each of the input multiplexers 120. One state of the flip-flop selects data from the DRAM controller 105. The other state of the flip-flop selects data that bypasses the DRAM controller 105, i.e., input data from the input controller output multiplexers 112. Thus, the data can bypass both the input controller section 103 and the DRAM controller section 105.

The output controller section 107 has an output queue 122. In the preferred embodiment, the output queue 122 is a sixteen deep queue, having four-way arbitration. That is, the queue can store up to sixteen values for each input request line 101. It would be apparent to those skilled in the art that any queuing is acceptable. Thus, the queue might be deeper or not as deep.

Moreover, independent queues can be used. Thus, four independent queues could be used in an alternate preferred embodiment. Outputs from the output queue 122 are coupled to a set of 3:1 output multiplexers 124.

The output multiplexers 124 select between the output of the output queue 122, a bypass path which bypasses only the output controller section 107, or a bypass path which bypasses both the DRAM controller section 105 and the output controller section 107. The output of the multiplexers 124 are staged in output staging registers 126. The ASIC 100 outputs are obtained from output staging registers 126 along lines 127.

According to the preferred embodiment, the ASIC 100 can accept up to four requests from four independent requesters. In addition, the ASIC 100 can output data to up to four different requesters.

Figure 2:
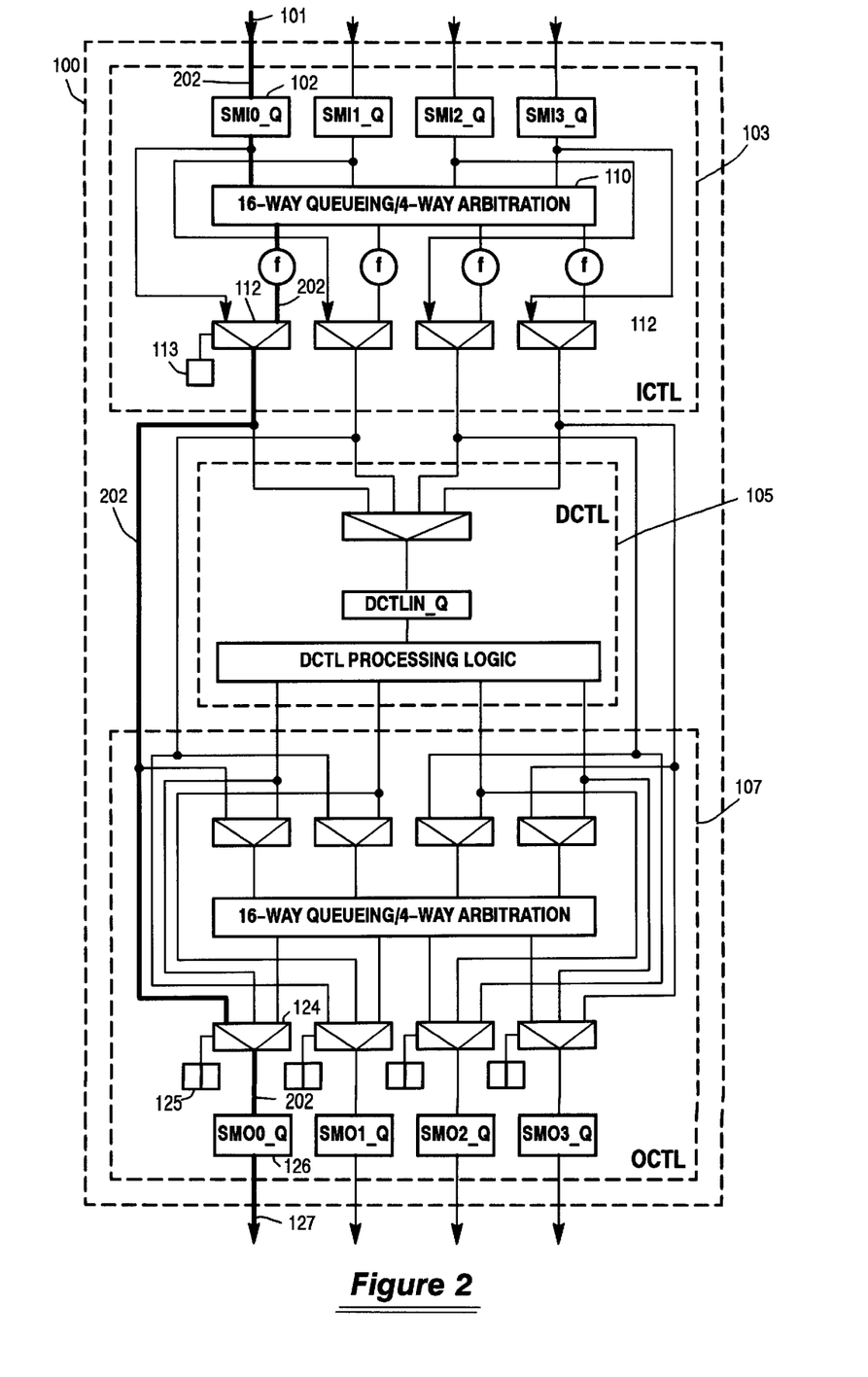
FIG. 2 is an ASIC 100 configured in the input controller mode.
Figure 3:
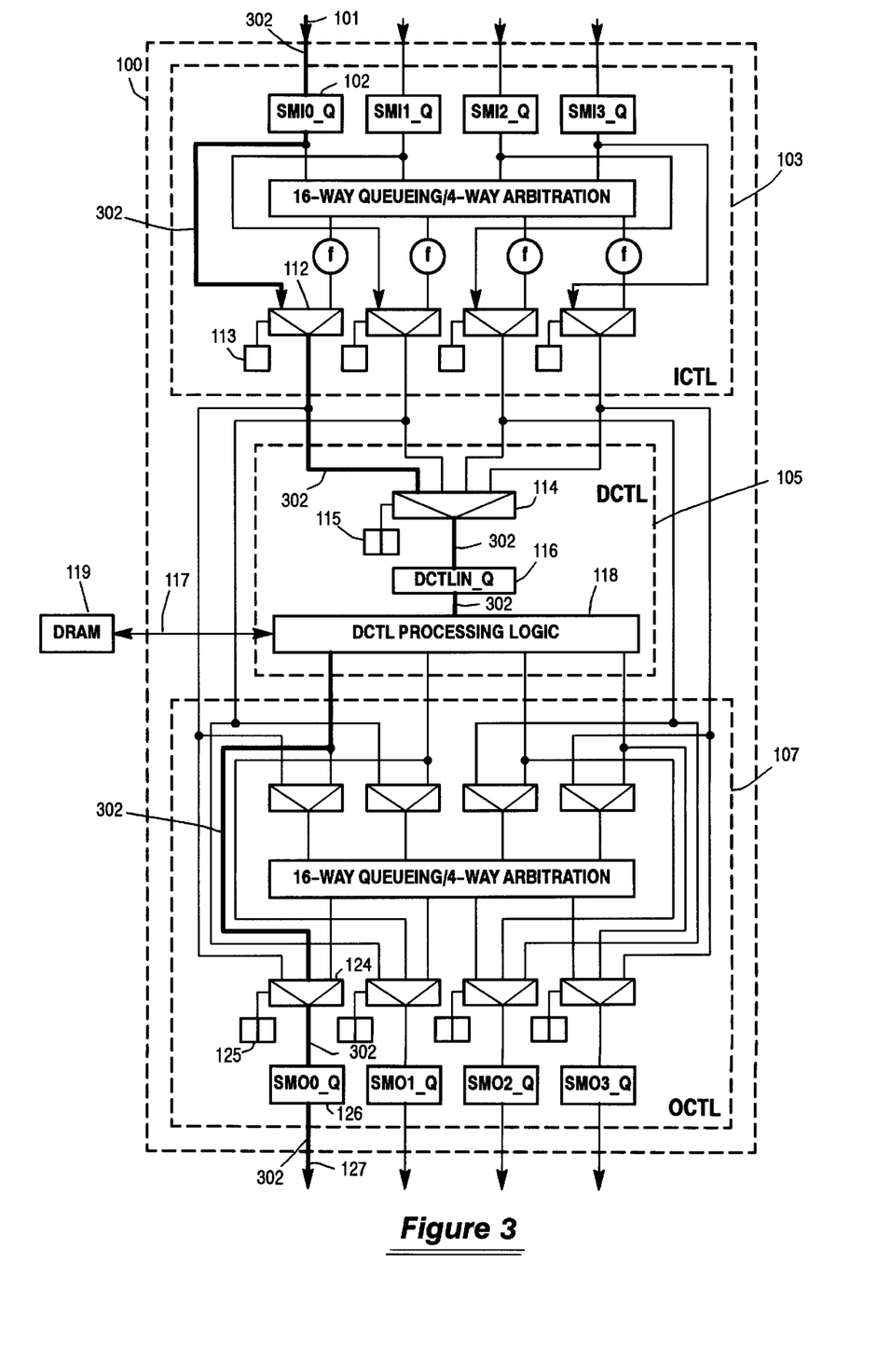
FIG. 3 is an ASIC 100 configured in the memory controller mode.
Figure 4:
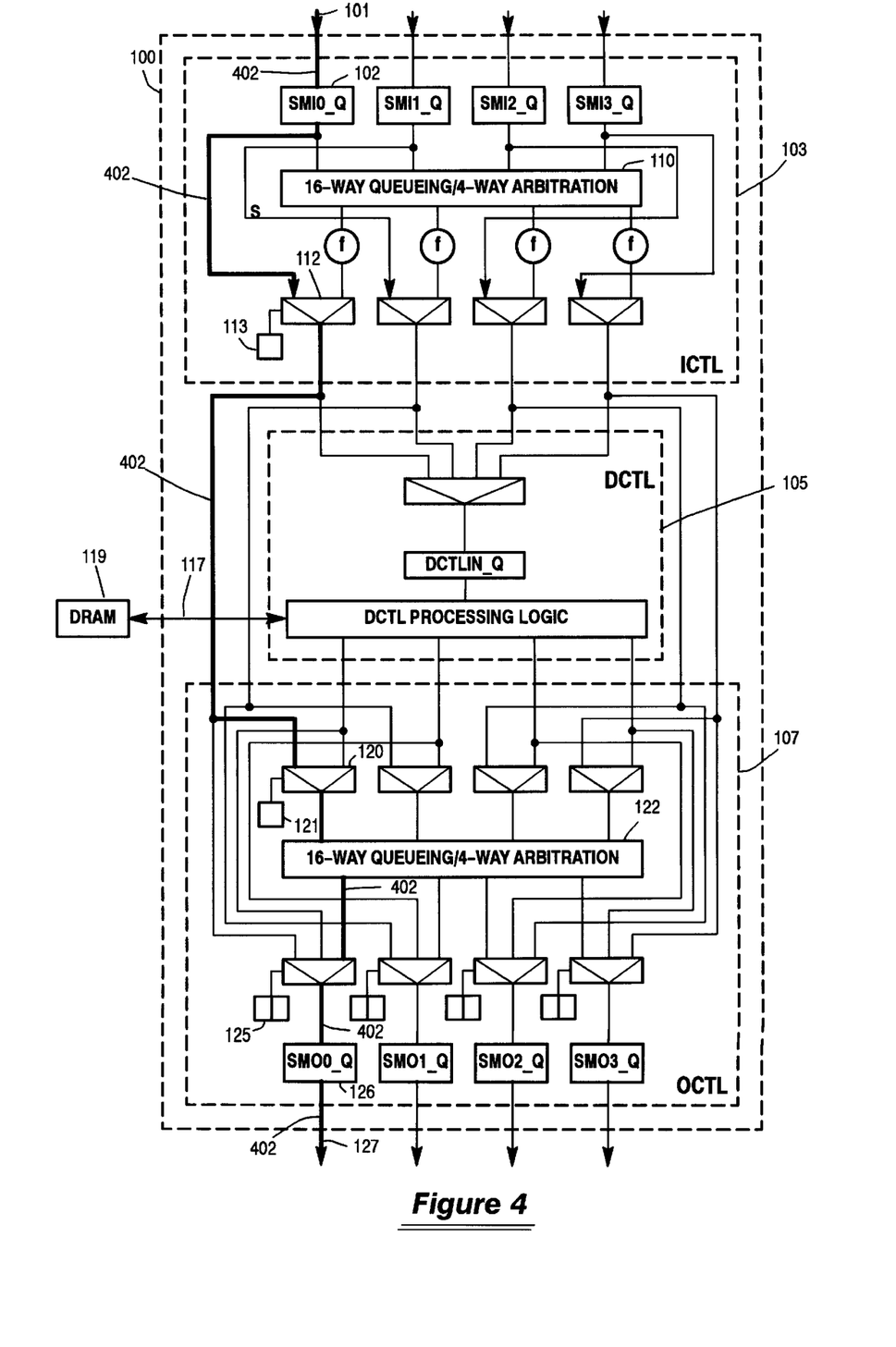
FIG. 4 is an ASIC 100 configured in the output controller mode.

From the above description, it is apparent that the flexibility offered by the architecture of the ASIC 100 is provided by the multiplexers and their corresponding controllers. By appropriately configuring the multiplexer controls, the ASIC 100 can function as an input controller, a DRAM controller, an output controller, or some combination (e.g., all three functions). This flexible functionality is described with reference to FIGS. 24.

FIG. 2 illustrates the ASIC 100 in its input controller mode. That is, the ASIC 100 bypasses both the DRAM controller section 105 and the output controller section 107. To accomplish this in the preferred embodiment, the flip-flop 113 is configured to control the output multiplexer 112 to input data from the input queue 110. The output multiplexer 124 controller, register 125, is configured to control the input of the multiplexer 124 to input data from the output of the output multiplexer 112. The output of the output multiplexer 124 is input to the staging register 126. The staging register 126 outputs the data on line 127. The ASIC 100 in this input controller configuration passes data from the input controller section 103 directly to the output of the ASIC 100 on line 127, through the output multiplexer 124 and staging register 126.

The path of the data when the ASIC 100 is in the input controller configuration thus becomes the path indicated by heavy line 202. Note that the heavy line 202 is by way of example only. That is, data from any of the input staging registers 102 can be propagated through a path similar to heavy line 202. In such a manner, the ASIC 100 can bypass data from any input line 101 around the memory controller section 105 and the output controller section 107, such that the ASIC 100 functions as an input controller.

FIG. 3 illustrates the ASIC 100 in its memory controller mode. That is, the ASIC 100 bypasses both the input controller 103 and the output controller 107. To accomplish this in the preferred embodiment, the flip-flop 113 is configured to control the output multiplexer 112 to input data from the input staging register 102. The output multiplexer 124 controller, register 125, is configured to control the input of the output multiplexer 124 to input data from the processing logic 118. The output of the output multiplexer 124 is input to the staging register 126. The staging register 126 outputs the data on line 127. The ASIC 100 in this memory controller configuration passes data directly to the processing logic 118. Any data resulting from the memory access is passed through the output staging register 126 on line 127. In the memory controller configuration, the ASIC 100 performs any memory accesses required by the input request by operation of the processing logic 118. The accesses, for example READ or WRITE, are performed across the bus 117 to the memory 119. In the preferred embodiment, the memory 119 is a DRAM.

The path of the data when the ASIC 100 is in the memory controller configuration thus becomes the path indicated by heavy line 302. Note that the heavy line 302 is by way of example only. That is, a request from any of the input lines 101 can be propagated through a similar path through the DRAM controller section 105, and out the lines 127. heavy line 302. In such a manner, the ASIC 100 can bypass data from any input line 101 around the input controller section 103 and the output controller section 107, such that the ASIC 100 functions as an memory controller.

FIG. 4 illustrates the ASIC 100 in its output controller mode. That is, the ASIC 100 is configured to bypass both the input controller section 103 and the DRAM controller section 105. To accomplish this in the preferred embodiment, the flip-flop 113 is configured to control the output multiplexer 112 to input data from the staging register 102. In the output controller configuration, the memory controller 105 must be bypassed. To bypass the memory controller section 105, the flip-flop 121 is configured to cause the multiplexer 120 to input data from the output of the multiplexer 112. The output of the multiplexer 120 is input to the output queue 122. The output multiplexer 124 controller, register 125, is configured to control the multiplexer 124 to input the output of the output queue 122. The output of the output queue 122 is input to the multiplexer 124. The output of the output multiplexer 124 is input to the output staging register 126. The output staging register 126 outputs the data on line 127. The ASIC 100, in the output controller configuration, passes data from the input line 101 to the output controller section 107 by configuring the multiplexers and their respective controls as described above.

The path of the data when the ASIC 100 is in the input controller configuration thus becomes the path indicated by heavy line 402. Note that the heavy line 402 is by way of example only. That is, data from any of the input lines 101 can be propagated through a path similar to heavy line 402. In such a manner, the ASIC 100 can bypass data from any input line 101 around the input controller section 103 and the memory controller section 105, such that the ASIC 100 functions as an output controller.

Figure 5:
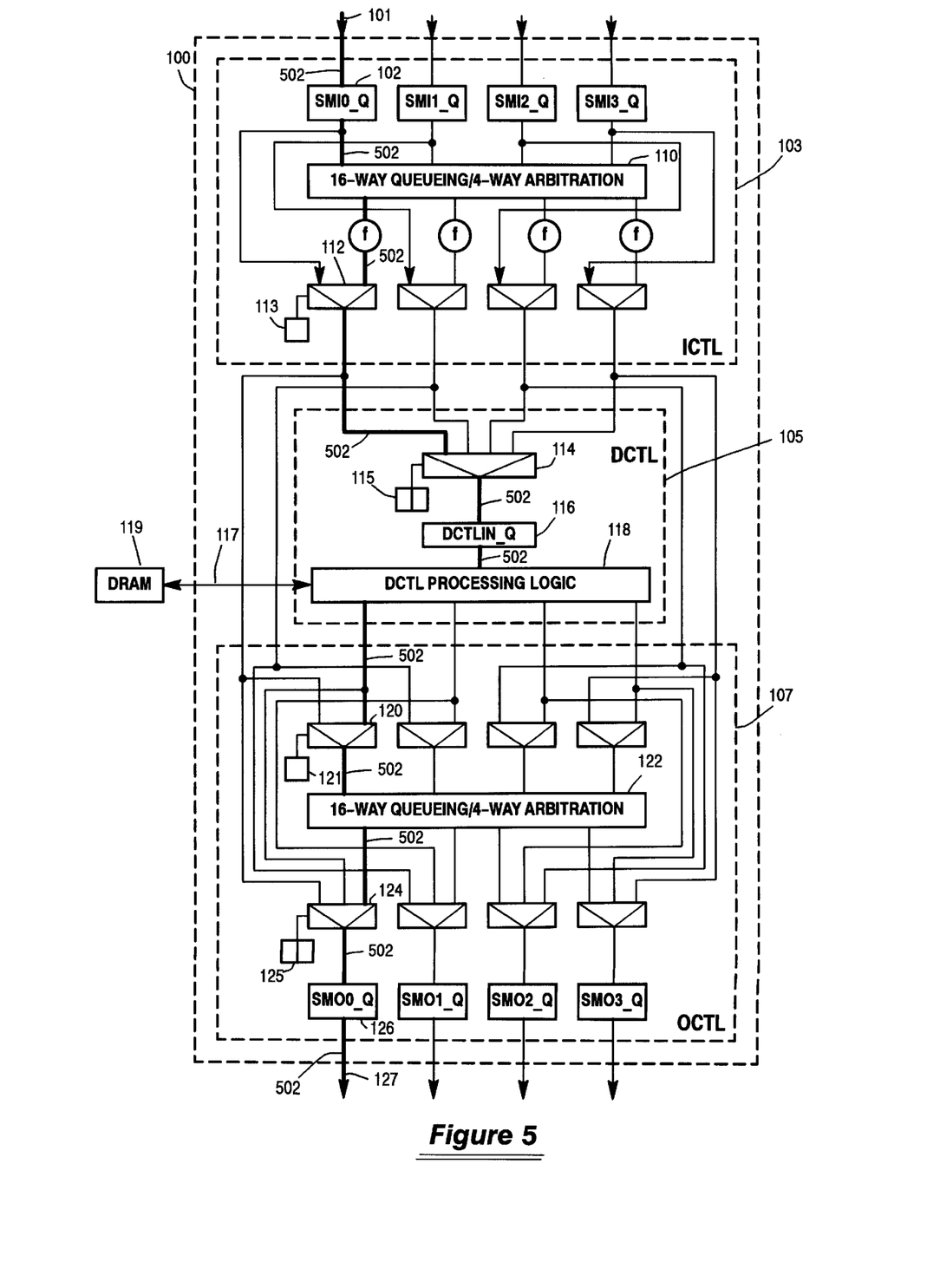
FIG. 5 is an ASIC 100 configured to perform the input controller, output controller, and memory controller functions.

The ASIC 100 can also be configured to perform all of the functions of a memory controller including inputting memory access requests from requesters, making memory access requests, and outputting the results of those memory access requests. Referring to FIG. 5, an ASIC 100 configured to perform all of functionality of the memory controller is described. A memory request from a requester is input over line 101 to input staging register 102. multiplexer selection control flip-flop 113 is configured to control the multiplexer 112 to input data from the input queue 110, thereby placing the input controller section 103 in the data path. Input multiplexer selection control flip-flop 121 controls multiplexer 120 to input data from the processing logic 118. As a result, the DRAM controller section 105 is in the data path. In the particular example in FIG. 5, the selection control register 115 controls the multiplexer 114 to select the data output from multiplexer 112. The request is stored in the DRAM staging register 116. After the request is processed by the processing logic 118, any result of the processing is output to the multiplexer 120. The control flip-flop 121 is configured to control the multiplexer 120 to input data output by the processing logic 118. The data is subsequently stored in the output queue 122. The selection register 125 is configured to control the output multiplexer 124 to input data from the output queue 122, thereby placing the output controller 107 in the data path. Data is output from the output multiplexer 124 to the output staging register 126. The data is output from the ASIC 100 over line 127.

The path of the data when the ASIC 100 is in the fill function memory controller configuration thus becomes the path indicated by heavy line 502. Note that the heavy line 502 is by way of example only. That is, data from any of the input lines 101 can be propagated through a path similar to heavy line 502. In such a manner, the ASIC 100 can perform all of the functions of a memory controller: input controller, memory controller, and output controller, on a single ASIC.

The configuration of the multiplexer controlling flip-flops and registers can be performed in a number of ways. For example, the flip-flops and registers can be hardwired according to specific user requirements. Increased flexibility results however by using programmable read only memories (PROMs) that store the configuration for each of the controlling flip-flops and registers. Moreover, as described above, there is no requirement that the storage states for the flip-flops and registers must be in independent storage locations. Thus, a single memory word could store the configuration states for a plurality of the controlling flip-flops and registers. Even greater flexibility is achieved by providing software control of the configuration of the states of the controlling flip-flops and registers. For example, the states of the controlling flip-flops and registers could be initialized at system initialization and/or through system management functions. Like PROMs, a software-based configuration can be easily modified. Unlike PROMs however, a software solution does not require the system to be shutdown for reprogramming.

Figure 6:
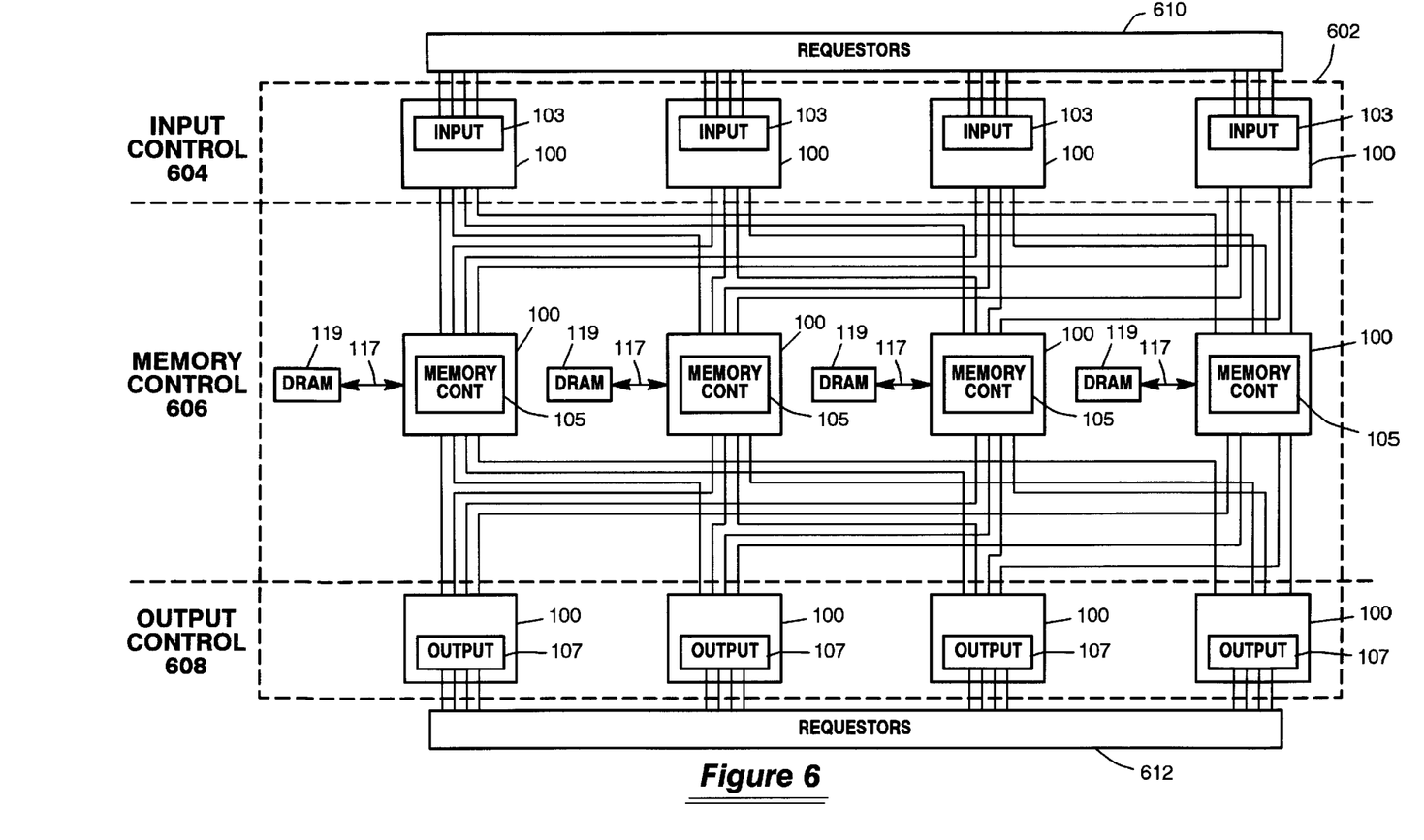
FIG. 6 is a memory board 602 having a fully interconnected input memory, and output controller sections using ASICs 100.

An ASIC having the architecture disclosed herein provides flexible scalability. As a result, users of such ASICs can easily expand system resources in response to higher system demands. Scalability is explained with reference to FIG. 6. FIG. 6 illustrates a memory board 602 comprising a plurality of ASICs 100 designed according to the preferred embodiment of the present invention. Like the ASIC 100, itself, the memory board 602 is functionally divided into 3 sections: an input control section 604, a memory control section 606, and an output control section 608.

The input control section 604 comprises one or more ASICs 100. The one or more ASICs in the input control section 604 are configured as input controllers as described above with reference to FIG. 2. The memory control section 606 comprises one or more ASICs 100. The one or more ASICs 100 in the memory control section 606 are configured as memory controllers as described above with reference to FIG. 3. The output control section 608 comprises one or more ASICs 100. The one or more ASICs in the output control section 608 are configured as output controllers as described above with reference to FIG. 4.

In the preferred embodiment, a memory board such as memory board 602 can have up to twelve ASICs 100, four in the input control section 604, four in the memory control section 606, and four in the output control section 608. It would be apparent to those skilled in the art that more ASICs 100 could be added, if desired, provided that sufficient space existed on the board for the additional ASICs 100, and sufficient power was supplied to the board to power the additional ASICs 100.

A board configured as shown in FIG. 6 can input up to sixteen requests from separate and independent requesters 610. The up to sixteen requests can be directed to any of the memory controller ASICs 100 in the memory control section 606. This results from the fill interconnectivity between the outputs of the input controller ASICs 100 in the input control section 604 and the inputs of the memory controller ASICs 100 in the memory control section 606. The memory controller ASICs 100 in the memory control section 606 perform the memory accesses to the memory 119 required by the up to sixteen requests.

Data resulting from the memory accesses performed by the memory controller ASICs 100 in the memory control section 606 is output through the output controller ASICs 100 in the output control section 608. Because the outputs of the memory controller ASICs 100 in the memory control section 606 are filly connected to the inputs of the output ASICs 100 in the output control section 608, any memory controller ASIC 100 in the memory control section 606 can output data to any output ASIC 100 in the output control section 608, and correspondingly, to any requester 612 attached to an output ASIC 100 in the output control section 608.

Figure 7:
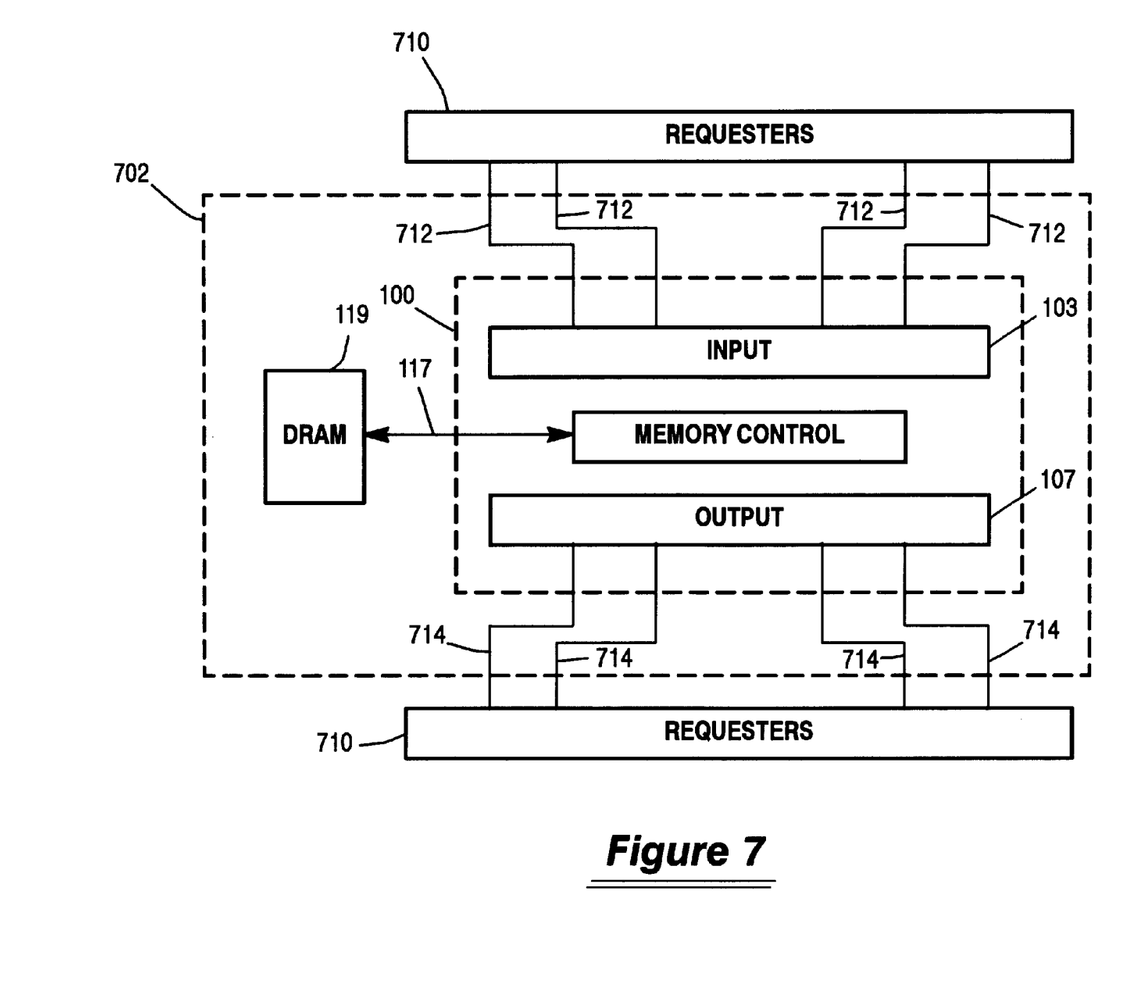
FIG. 7 is another example of a memory board configuration.

The example shown in FIG. 7 illustrates a configuration that lies on the opposite end of the scalability spectrum, as the example shown in FIG. 6. As can be seen in FIG. 6, separate ASICs 100 are used for each mode of operation. That is, 4 ASICs 100 are used in the input control section 604, 4 ASICs are used in the memory control section 606, and 4 ASICs are used in the output control section 608. Note that this is just one example of a configuration that is shown for illustrative purposes only. Many other configurations are possible. For example, a smaller number of ASICs could have been used to support the same functions shown in FIG. 6.

Accordingly, referring back to FIG. 6, instead of using one ASIC for each mode of operation (input, memory controller and output), a single ASIC could have been used. That is, each of the vertical rows comprising 3 ASICs 100 shown in FIG. 6, could be replaced with a single ASIC programmed for all three modes of operation, as discussed above with reference to FIG. 5. Thus, a total of 4 ASICs, instead of the 12 shown in FIG. 6, could have been used to support the same function as depicted in FIG. 6.

Further, it should be apparent that various number of ASICs between a minimum of 4 and a maximum of 12 could also be used to support the same functionality shown in the example in FIG. 6. It should be noted that the numbers used in the preceding example are based on an assumption that each ASIC 100 is designed to handle a maximum of 4 requesters, as shown by the input and output sections 103 and 107, respectively. As stated, this is a design parameter of the preferred embodiment of the present invention. However, the number of inputs and outputs 103 and 107 respectively, can vary in alternate embodiments of the present invention. As such, the numbers used in the examples recited herein, should not be construed to limit the scope and breadth of the present invention.

The configuration depicted in the example shown in FIG. 7 illustrates a memory board 702 that is populated with a single ASIC 100, which is programmed for all three modes of operation. That is, the single ASIC 100 shown is programmed to operate in the input control mode, the memory control mode and the output control mode, as described above with reference to FIG. 5.

Accordingly, the requesters 710 are coupled with the ASIC 100 via the input control section 103. It should be noted that each input and output line 712 and 714, respectively, represents a bus that can be of arbitrary length depending on a specific implementation of the present invention. The outputs 714 of the ASIC 100 are coupled with the requestors 710. The DRAM 119 is coupled with the memory control section 105 of the ASIC 100.

The foregoing examples illustrate the scalable nature of memory boards having memory controllers designed according to the preferred embodiment of the present invention. It would be apparent to those skilled in the art that other memory board configurations can be designed. The considerations for the other configurations include number of inputs and outputs, desired parallelism, input and output bandwidths, number of DRAMs that need to be controlled, and size of the memory boards. In addition, multiple memory boards, such as the memory board shown in FIG. 6, can be tied together in a single system. These other configurations fall within the scope and spirit of the present invention and its scalable nature.

While various embodiments of the present invention have been described above, it should be understood that they have been presented by way of example only, and not limitation.

Thus, the breadth and scope of the present invention should not be limited by any of the above-described exemplary embodiments, but should be defined only in accordance with the following claims and their equivalents.

What is claimed is:

1. A system for selectively interconnecting inputs to outputs on different sections of a single ASIC chip having different functionality modes, to achieve scaling of performance and number of requesters, comprising within a single ASIC chip type:
   a memory input section having a plurality of inputs and a plurality of outputs;
   a memory controller section having a plurality of inputs and a plurality of outputs;
   a memory output section having a plurality of inputs and a plurality of outputs;
   first bypassing means for bypassing said memory input section;
   second bypassing means for bypassing said memory controller section; and
   third bypassing means for selectively bypassing said memory output section, whereby, normally connected inputs to outputs are selectively bypassed;
   whereby a plurality of different controller modes of operation are obtainable from the same chip.

2. The system as recited in claim 1, wherein said first bypassing means comprises selective coupling means for selectively coupling said memory input section inputs directly to ones of said memory controller section inputs and said memory output section inputs.

3. The system as recited in claim 1, wherein said second bypassing means comprises selective coupling means for selectively coupling said memory controller section outputs to ones of said memory output section inputs and outputs.

4. The system as recited in claim 1, wherein said third bypassing means comprises:
   first selective coupling means for selectively coupling said memory input section outputs directly to ones of said memory controller section inputs and said memory output section outputs; and
   second selective coupling means for selectively coupling said memory controller section outputs directly to ones of said memory output section outputs.

5. The system as recited in claim 1, further comprising means, having:
   first selective coupling means for selectively coupling said memory input section inputs through said memory input section to said memory input section outputs;
   second selective coupling means for selectively coupling said memory input section outputs through said memory controller to the output of the memory controller; and
   third selective coupling means for selectively coupling the output of the memory controller section through said memory output section to the outputs of the memory output section.

6. The system as recited in claim 1, wherein the memory input section comprises an input queue to queue memory requests.

7. The system as recited in claim 6, where said input queue comprises a plurality of queues, one for each of said memory input section inputs and outputs.

8. The system as recited in claim 1, where in said memory controller section comprises:
   an input selection device; and
   means for selectively coupling an input to said input selection device to processing logic, said processing logic performing required memory accesses and output results of said required memory accesses.

9. The system as recited in claim 1, wherein the memory output section comprises an output queue to queue any results of memory requests.

10. The system as recited in claim 9, where said output queue comprises a plurality of queues, one for each of said memory output section inputs and outputs.

11. The system as recited in claim 5, wherein said first, second, and third selective coupling means comprise multiplexers.

12. The system as recited in claim 5, further comprising configuration means for configuring said first, second, and third selective coupling means.

13. The system as recited in claim 12, wherein said configuration means comprises initialization means to initialize said first, second, and third selective coupling means according to a predetermined mode.

14. A memory controller system comprising:
   one or more input ASICs, moded to input a plurality of inputs and having a plurality of outputs;
   one or more memory controller ASICs, moded to control a memory subsection having a plurality of outputs;
   one or more output ASICs moded to output a plurality of outputs and having a plurality of inputs;
   means for selectively coupling said outputs of said input ASICs to said inputs of said memory controller ASICs;
   means for selectively coupling said outputs of said memory controller ASIC to said inputs of said output ASICs; and
   wherein said input ASICs, said memory controller ASICs, and output ASICs have the same architectural design, but are configured in different modalities.

15. The memory system of claim 14, comprising different numbers of input ASICs, memory controller ASICs, and output ASICs.

16. A memory controller system comprising:
   a plurality of ASICs arranged in parallel and scalable to increase the number of requests handled simultaneously,
   each said ASIC having thereon a memory input section having a plurality of inputs adapted to receive memory requests from plural requestors,
   each said ASIC having thereon a memory output section having a plurality of outputs adapted to access addresses in a main memory for writing into and reading from the main memory in response to requests from said requester,
   each said ASIC having thereon a memory controller section having a plurality of inputs normally coupled between said memory input section and said memory output section, and
   bypass circuit means coupled to the inputs and the outputs between said sections, and
   selection means active to configure said memory controller system for memory input or memory output or memory controller functionality or as a memory controller system having all three functions and the number of simultaneous requests are scalable by configuring sections in series and in parallel.

* * * * *